April 25, 1933.  D. J. STEWART  1,905,011

TEMPERATURE REGULATING SYSTEM

Filed Jan. 10, 1931

INVENTOR
Duncan J. Stewart
BY
ATTORNEYS

Patented Apr. 25, 1933

1,905,011

UNITED STATES PATENT OFFICE

DUNCAN J. STEWART, OF ROCKFORD, ILLINOIS, ASSIGNOR TO HOWARD D. COLMAN, OF ROCKFORD, ILLINOIS

TEMPERATURE REGULATING SYSTEM

Application filed January 10, 1931. Serial No. 507,900.

This invention relates to the electrical control of temperature regulating systems in buildings and more particularly to a system wherein the radiation of heat from radiators located in different rooms of a building is governed by valve operators driven by electric motors which are controlled by individual room thermostats.

In such systems, the thermostat initiates each operator cycle by closing a starting circuit after which a maintaining circuit is closed for carrying the motor current for the remainder of the cycle. When a plurality of valve operators are arranged to be controlled by one thermostat and the several motors do not run at the same speed, a condition, hereinafter more fully described, is apt to arise wherein the operator first completing its cycle will be started by another operator independently of the thermostat with the result that all of the associated operators will run continuously.

The object of the present invention is to provide a novel mechanism for the control of the circuits of a plurality of power operators in the environment above described so as to avoid the necessity for accurate synchronization, at the same time avoiding the possibility of one operator being started independently of the thermostat.

In the accompanying drawing.

Figure 1:
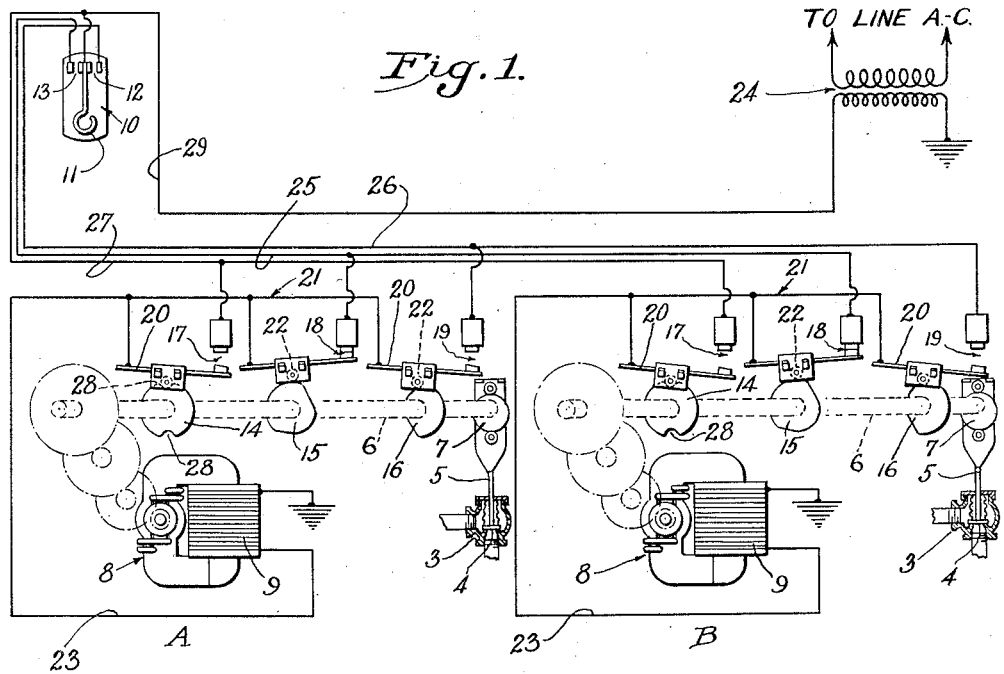
Figure 1 is a schematic view and wiring diagram of part of a heating system embodying the features of the present invention.
Figure 2:
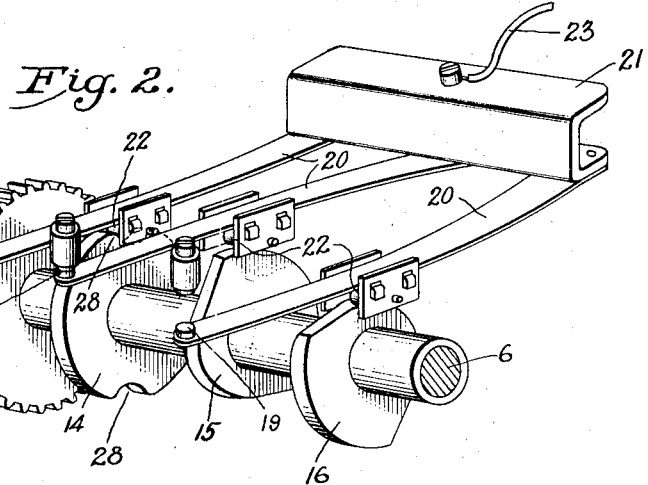
Fig. 2 is a perspective view of one of the heat regulating devices employed.

Referring first to Fig. 1, the invention is embodied in a heating system in which the supply of heat to each room of the building to be heated is regulated by manipulation of the valves 3 which control the flow of heating fluid to the radiators in the room. The member 4 of each valve is on a stem 5 arranged to be moved in opposite directions to alternately seat and unseat the member in successive half revolutions of a shaft 6 carrying an actuating cam 7 and arranged to be driven through speed reduction gearing by a unidirectional motor 8 having an energizing winding 9.

The operation of the motor to define successive valve-opening and closing cycles of an operator is under the joint control of the thermostat 10 in the room where the operator is located and a mechanically operable switch mechanism incorporated in the motor unit. Herein the thermostat comprises a thermosensitive element 11 having a tongue carrying a contact which cooperates with two relatively stationary contacts to form two switches 12 and 13 which are closed selectively by the tongue depending on whether the room temperature is above or below a value predetermined by the setting of the thermostat.

In the present embodiment the switch mechanism above referred to includes three cams 14, 15 and 16 fast on the shaft 6 and arranged to control the opening and closing of three switches 17, 18 and 19 respectively. Each switch is formed by a stationary insulated contact and a cooperating movable contact on one end of a resilient spring arm 20 secured at its other end to a metal block 21 and tending to move its contact out of engagement with the cooperating stationary contact whereby to open its switch. The spring arms 20 carry insulated rollers 22 and constitute the followers for the different cams which, according to their angular positions on the shaft 6, hold their switches closed or allow their switches to open in timed relation to the movement of the valve member 4.

The contacts of the switches 17, 18 and 19, made common by attachment to the bar 21, are connected by a wire 23 to one terminal end of the motor winding 9. The other winding terminal may be grounded to the motor frame and thereby is made electrically common to the metallic parts of the heating system and one terminal of a source 24 of alternating current.

The switch 18 cooperates with the thermostat switch 13 to control the starting of the motor in one of its valve operating cycles, for example the valve-opening cycle, and therefore is electrically connected to the stationary contact of this thermostat switch by an insulated conductor 25. The cam 15 is shaped to allow the switch 18 to open after the initiation of the valve-opening cycle and to close this switch just prior to the completion of the valve-closing cycle, thereby preparing the starting circuit by which the valve-opening cycle is initiated by subsequent closure of the thermostat switch 13. In a similar way, the stationary contact of the switch 19 is connected by a conductor 26 to the stationary contact of the thermostat switch 12 which initiates the valve-closing cycle. The cam 16 is shaped to allow the switch 19 to open in the initial part of the valve-closing cycle and to close the switch in the latter part of the valve-opening cycle.

An independent maintaining circuit is provided to carry the motor current for the major portion of each cycle in order to minimize the current burden on the sensitive thermostat switches. This circuit is controlled by the switch 17, the stationary contact of which is connected by an insulated conductor 27 to the tongue or movable contact of the two thermostat switches. The cam disk 14 has two notches 28 in its periphery which are so shaped and so disposed relative to the cams 15 and 16 that the switch 17 will be closed shortly after the initiation of each cycle and prior to the opening of the switch 18 or 19 which initiated such cycle. When the valve member 4 approaches either of its limiting positions, the follower arm 20 controlling the switch 17 drops into a notch 28 and allows the maintaining switch to open thereby terminating the cycle with either the switch 18 or the switch 19 closed and the proper circuit thereby prepared for starting the next cycle in response to the closure of the proper thermostat switch.

Current from the source 24 is supplied to the starting and maintaining circuits above described by a conductor 29 connected to the conductor 27 which, it will be observed, is common to all three of the circuits. Thus the conductor 29 is interposed in series with the switch 17 controlling the main or running circuit of the operator and through the medium of the thermostat switches 12 and 13 is made electrically common to both of the starting circuits controlled by these switches.

The control circuits function in the following manner in the execution of the valve-opening cycle, the switches 17 and 19 being open and the switch 18 being closed when the shaft 6 is in valve-closed position as shown in Fig. 1. As the temperature in the room falls, the thermal element 11 moves to close the switch 13 thereby completing a starting circuit from the current source 24 through conductor 29, switch 13, conductor 25, switch 18, plate 21, conductor 23, and the winding 9 to the grounded side of the current source. This initiates the operation of the motor to move the valve member 4 away from its seat and shortly thereafter the cam 14 closes the switch 17 thereby completing the maintaining circuit through the winding 9. After this circuit has been established, the switch 18 is opened by the cam 15. The motor continues to run until the running circuit is opened by the cam 14, the valve member being stopped in open position. By this time the switch 19 will have been closed thereby preparing the other starting circuit for the next operating cycle which is controlled by the thermostat switch 12.

From the foregoing description of the circuits by which one valve operator is controlled, it will be apparent that the same thermostat may be used to control one or more other operators for the valves of different radiators that may be located in one room. This may be accomplished simply by connecting the switches 17, 18 and 19 of the different operators in parallel relation. Fig. 1 shows the circuit arrangement for two valve operators thus connected and referred to hereinafter as operators A and B. With this arrangement of circuits, it will be seen that both operators will be started simultaneously in response to the thermostat.

Now assume that one operator, for example A, runs faster than the other. After being started by closure of the thermostat switch 13 for example, each operator will run until its maintaining switch 17 has opened. At the time when the switch 17 of the faster operator A is opened, its switch 19 will have been closed to prepare this operator for the next cycle, and the same switch of the operator B may have been closed and its maintaining switch 17 yet unopened by reason of the slower speed at which this latter operator runs. When this condition prevails, a circuit will be established from the current source through conductors 29 and 27, switch 17 of operator B, arms 20 and bar 21, switch 19 of operator B, conductor 26, switch 19 of operator A, conductor 23, motor winding of operator A to the grounded side of the current source. Another cycle of the operator A is thus initiated independently of the thermostat and continues until the maintaining switch 17 of the slower operator B is opened. Thus, if the two operators are sufficiently out of synchronism, the above circuit will maintain the motor of the operator A energized long enough for its running switch 17 to be closed, after which this operator will continue through another complete cycle. In this one, the slower operator will start the faster one, then the faster will initiate a cycle of the slower and so on with the result that both operators will run continuously and independently of the controlling thermostat.

The present invention contemplates overcoming the difficulty above mentioned by timing the closing of the switches 18 and 19 of each operator relative to the opening of the maintaining switch 17 so that the objectionable circuit above described will not remain closed for an interval long enough for the slower operator to start the faster operator and continue its operation until the maintaining switch of the later operator becomes closed. Preferably, this result is attained by shaping the cams 14, 15 and 16 and setting them relative to each other on the shaft 6 so that in the successive operator cycles, the switches 18 and 19 will be closed substantially simultaneously with or just prior to the opening of the maintaining switch 17 by the cam 14. Thus, the maintaining switch and either starting switch 18 and 19 of one operator do not remain closed simultaneously for an interval as long as that required for the camshaft 6 of the associated operator to move from rest position to a position at which the maintaining switch 17 is closed.

I claim as my invention:

1. In a heating system, the combination of a pair of valves controlling the radiation of heat from different radiators in a room to be heated, a power operator for each valve including an electric motor and a shaft rotated thereby and adapted in successive half revolutions to alternately open and close the associated valve, a thermostat common to both of said operators, a circuit for each operator for maintaining energization of the operator motor independently of said thermostat including a switch actuated by said shaft so as to be opened when the shaft reaches valve-open or valve-closed position and to be closed in each operator cycle after a predetermined movement of said shaft, a pair of circuits for each operator arranged to be closed selectively by said thermostat to initiate successive cycles of the associated operator and each including a switch adapted to be closed in the approach of said shaft toward one of its rest positions but prior to opening of said maintaining switch, and to be opened in the subsequent movement of the shaft after closure of the maintaining switch, and cam means on each operator shaft for timing the actuation of the associated starting circuit switches so that the time interval between the closure of either of such switches and the succeeding opening of the maintaining switch is shorter than the interval between the starting of the other operator shaft and the closure of the maintaining switch actuated thereby.

2. In a heating system, the combination of a pair of valves each controlling the radiation of heat into a room to be heated, a pair of power operators each arranged to alternately open and close one of said valves in successive operating cycles and including an electric motor and a rotary control element, two starting circuits for the motor of each operator, a thermostat for closing said circuits selectively to initiate successive cycles of the operators, a pair of switches for each of said operators included in the respective starting circuits thereof, a maintaining circuit for the motor of each operator including a switch arranged to be closed by said control element shortly after the beginning of each operator cycle and to be opened to terminate such cycle, and means rotatable with said control element for closing said first mentioned switches alternately in successive operator cycles at a time substantially simultaneously with but just prior to the opening of said maintaining switch.

3. In a heating system, the combination of a pair valve operators each including an electric motor and adapted in successive cycles to interrupt and resume the supply of heat to a room to be heated, a thermostat for alternately closing two starting circuits through each of said motors whereby to initiate the successive cycles, a maintaining circuit for each operator adapted to be closed automatically by the operator motor after initiation of each cycle by the thermostat and to be opened to terminate the cycle, a pair of switches for each operator included in the respective starting circuits thereof, and means associated with each operator and actuated automatically by the motor thereof in each operator cycle to open one of said switches subsequent to the closure of said maintaining circuit and to close the other switch prior to the opening of the maintaining circuit, the time interval between the closure of either switch and the subsequent opening of the maintaining circuit in one operator being shorter than the interval between the starting of the other motor and the closure of its maintaining circuit.

4. In a heating system, the combination of a pair of power-actuated devices for controlling the supply of heat to different parts of a room to be heated, each of said devices including an electric motor, a thermostat common to said devices, circuits controlled selectively by said thermostat for initiating successive operating cycles of said devices, a circuit for each device operable to maintain operation of the associated motor and controlling the termination of said successive cycles, and automatically acting means associated with each device and operable in each cycle to successively close the associated maintaining circuit, open the starting circuit by which the cycle was initiated, prepare the other starting circuit for initiation of the succeeding cycle, and finally open the maintaining circuit, said circuit controlling functions being timed to prevent the establishment of a series circuit for one motor through the starting switch of such motor and the starting circuit and maintaining circuit switches of the other motor.

In testimony whereof, I have hereunto affixed my signature.

DUNCAN J. STEWART.